United States Patent
Cauwels et al.

(10) Patent No.: US 8,428,058 B2
(45) Date of Patent: Apr. 23, 2013

(54) OUT-OF BOX SERVICES CASCADING

(75) Inventors: Stephan Henri Cauwels, Utrecht (NL);
Sebastianus Maria Samsom, Zoetermeer (NL)

(73) Assignee: Koninklijke KPN N.V., The Hague (NL)

( * ) Notice: Subject to any disclaimer, the term of this patent is extended or adjusted under 35 U.S.C. 154(b) by 631 days.

(21) Appl. No.: 12/226,400

(22) PCT Filed: Apr. 24, 2007

(86) PCT No.: PCT/EP2007/003587
§ 371 (c)(1),
(2), (4) Date: Oct. 17, 2008

(87) PCT Pub. No.: WO2007/128405
PCT Pub. Date: Nov. 15, 2007

(65) Prior Publication Data
US 2009/0097482 A1 Apr. 16, 2009

(30) Foreign Application Priority Data
Apr. 28, 2006 (EP) ..................... 06008893

(51) Int. Cl.
*H04L 12/56* (2006.01)
(52) U.S. Cl.
USPC ............... 370/389; 370/395.3; 370/395.53

(58) Field of Classification Search ............... 370/395.53
See application file for complete search history.

(56) References Cited

U.S. PATENT DOCUMENTS

| | | | |
|---|---|---|---|
| 5,963,556 A * | 10/1999 | Varghese et al. | 370/401 |
| 2002/0009079 A1 * | 1/2002 | Jungck et al. | 370/389 |
| 2003/0123453 A1 * | 7/2003 | Ooghe et al. | 370/395.53 |
| 2004/0083295 A1 * | 4/2004 | Amara et al. | 709/229 |
| 2004/0093434 A1 | 5/2004 | Hovell et al. | |
| 2004/0202171 A1 * | 10/2004 | Hama | 370/395.1 |
| 2005/0286512 A1 | 12/2005 | Mahamuni et al. | |
| 2006/0021043 A1 * | 1/2006 | Kaneko et al. | 726/24 |
| 2006/0212549 A1 * | 9/2006 | Hokkyo et al. | 709/220 |

* cited by examiner

*Primary Examiner* — Chi H. Pham
*Assistant Examiner* — Shick Hom
(74) *Attorney, Agent, or Firm* — McDonnell Boehnen Hulbert & Berghoff LLP

(57) ABSTRACT

An efficient approach for cascading out-of-box services is disclosed. The inventive system has a packet router, with out-of-box interfaces, and out-of-box servers, the latter being connected to the interfaces and implementing the out-of-box services. The interfaces and the serves are configured in a virtual local area network (VLAN), as identified by a VLAN identifier (ID), which performs a specific number of the services and in a specific order on a stream of packets. The packet router, in a single action, routes packets with the VLAN ID to a particular VLAN in order to subject those packets to the number and order of services then associated with that VLAN ID.

20 Claims, 3 Drawing Sheets

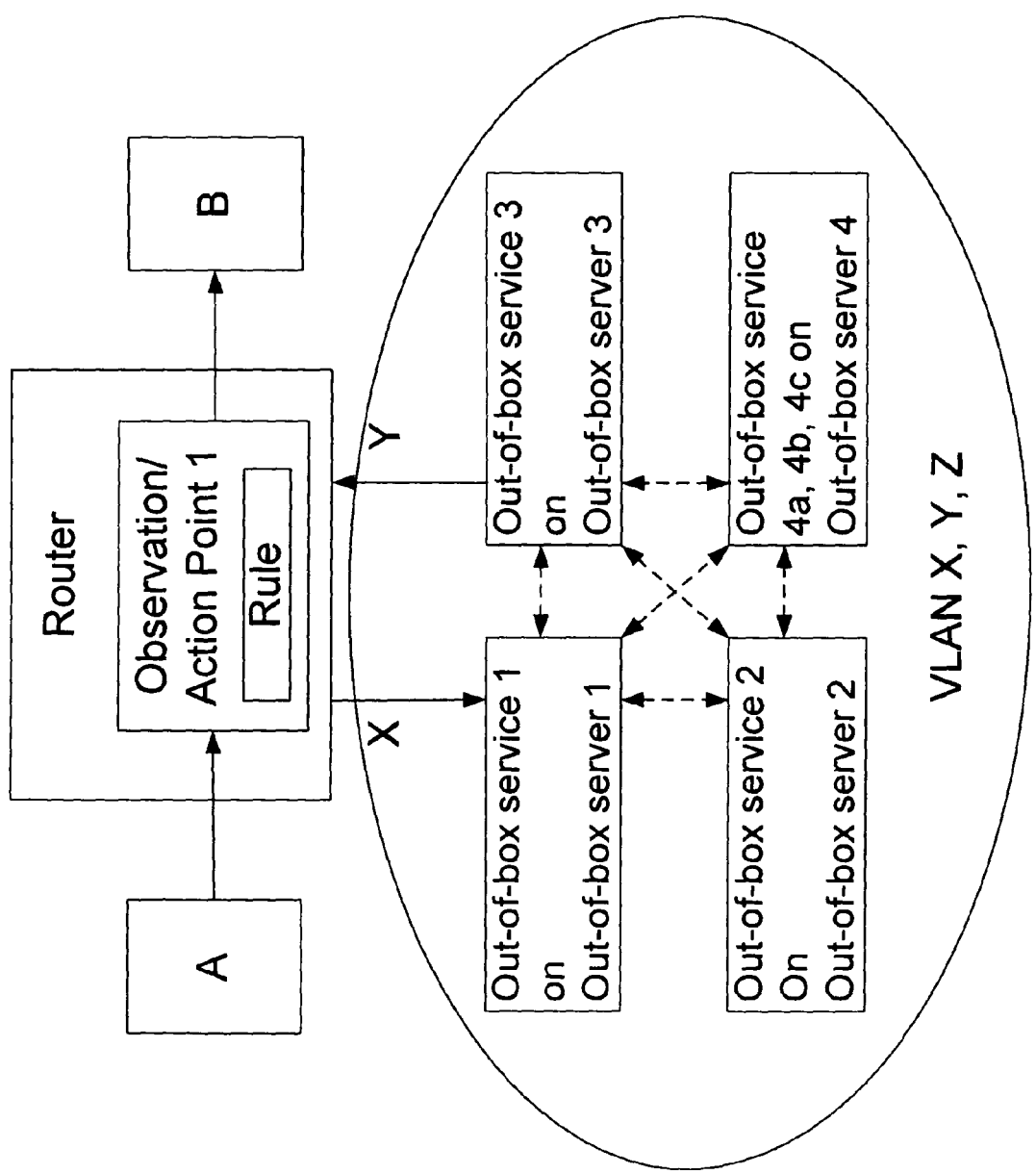

OUT-OF BOX SERVICES CASCADING

FIELD OF THE INVENTION

The invention relates to the cascading of out-of-box services.

BACKGROUND OF THE INVENTION

It is known that routers, commonly used for layer 3 routing, can offer the opportunity to intermediately route packets to an out-of-box service in order for the out-of-box service to perform some higher layer or advanced service like, e.g., data compression, before routing the packets to their intended destination. As illustrated in FIG. 1, this type of out-of-box routing is provided in two directions, from A to B and back from B to A. For each direction, an opposite flow through out-of-box interfaces X and Y is configured. In this way, an inverse service can be applied to each direction, such as compression in the direction from A to B and decompression in the direction from B to A.

From WO 2006/000629, it is known that packets can be subjected to more than one out-of-box service on more than one out-of-box server by intermediately re-routing packets through an observation point and a number of action points, thereby passing through an out-of-box interface more than once. Thus, a number of intermediate re-routing actions is performed, out and into the router, which equals a number of out-of-box services to be performed.

PROBLEM DEFINITION

The prior art is not able to process packets in an efficient manner when the packets need to be subjected to more than one out-of-box service via more than one out-of-box server.

The system known from WO 2006/000629 is very resource consuming in terms of processor load, memory usage and interface load.

AIM OF THE INVENTION

The aim of the invention is to provide a more efficient approach for intermediately re-routing packets when the packets need to be subjected to more than one out-of-box service via more than one out-of-box server.

SUMMARY OF THE INVENTION

The invention provides a system in which a packet router is connected to more than one out-of-box server through one or more out-of-box interfaces.

According to an aspect of the invention, the communication between the out-of-box servers is based on one or more VLANs.

According to another aspect of the invention, each VLAN is assigned a specific VLAN ID and a specific bi-directional packet flow through the out-of-box servers.

According to yet a further aspect of the invention, packets are subjected to a specific number and order of out-of-box services by sending the packets to a specific VLAN ID via the out-of-box interface.

According to another aspect of the invention, a single intermediate re-routing action by the router results in more than one out-of-box service performed on the packets by more than one out-of-box servers. This is most beneficial compared to the prior art and alternative approach as disclosed in WO 2006/000629, because more than one out-of-box service can be applied to intermediate routed packets, while resource consumption with respect to out-of-box interfaces, observation points and action points is largely decreased.

BRIEF DESCRIPTION OF THE DRAWINGS

The invention will be explained in greater detail by reference to exemplary embodiments shown in the drawings, in which:

FIG. 3 shows a schematic view of an exemplary embodiment according to the invention.

DETAILED DESCRIPTION OF THE INVENTION

For the purpose of teaching of the invention, preferred embodiments of the method and system of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

The invention provides a system in which a packet router is connected to more than one out-of-box server through one or more out-of-box interfaces. An exemplary embodiment in FIG. 3 illustrates a Router, connected to out-of-box server 1 through out-of-box interface X and to out-of-box server 3 through out-of-box interface Y. The communication between the out-of-box servers is based on one or more Virtual LANs (VLANs). In general, VLANs enable a group of servers on different physical LAN segments to communicate with each other as if they were all on the same physical LAN segment, by broadcasting information at layer 2. Different broadcast domains (VLANs) can be configured to define server groups and improve communication efficiency. Each broadcast domain can be given a specific VLAN ID.

Figure 1:
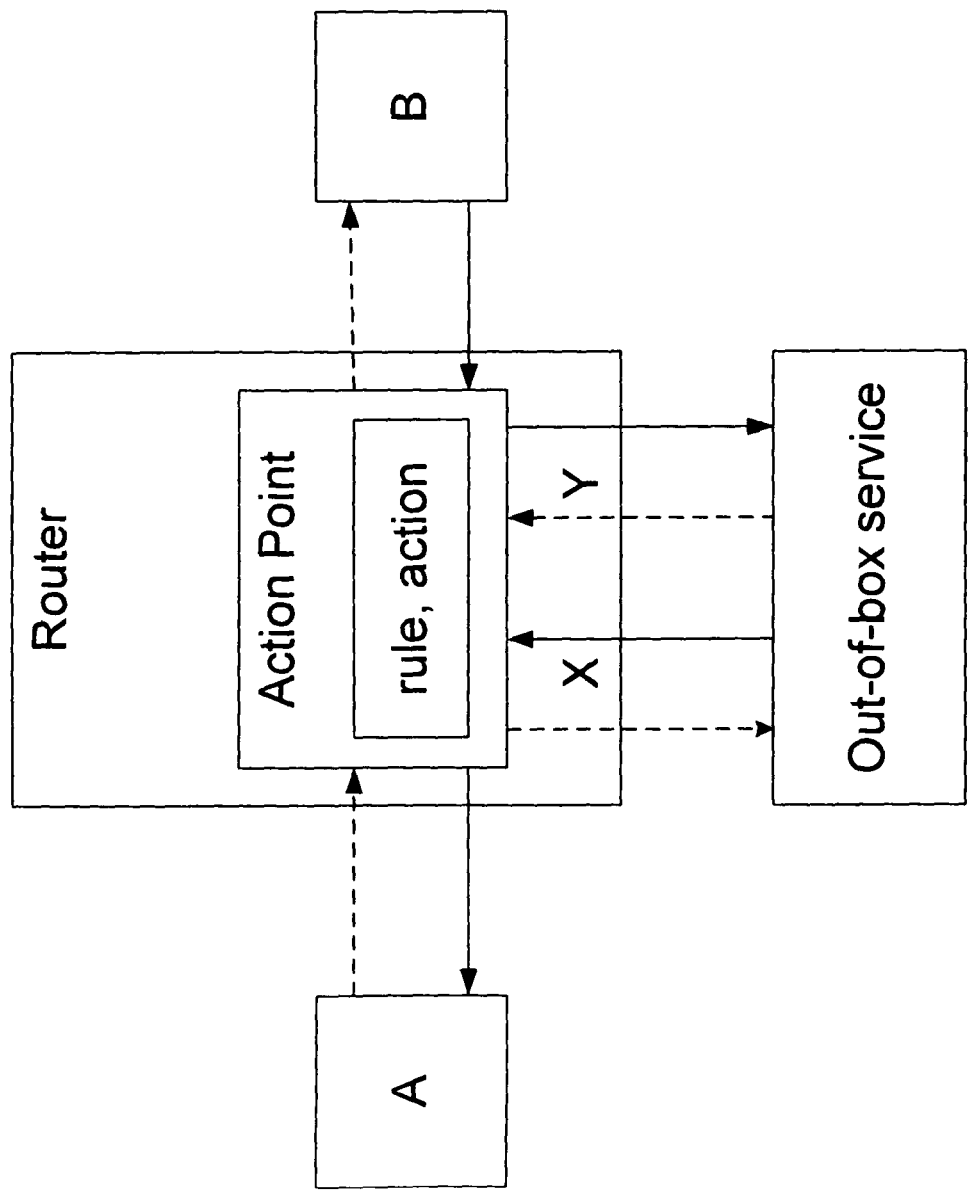
FIG. 1 shows a schematic view of a router supporting an out-of-box service according to the prior art.
Figure 2:
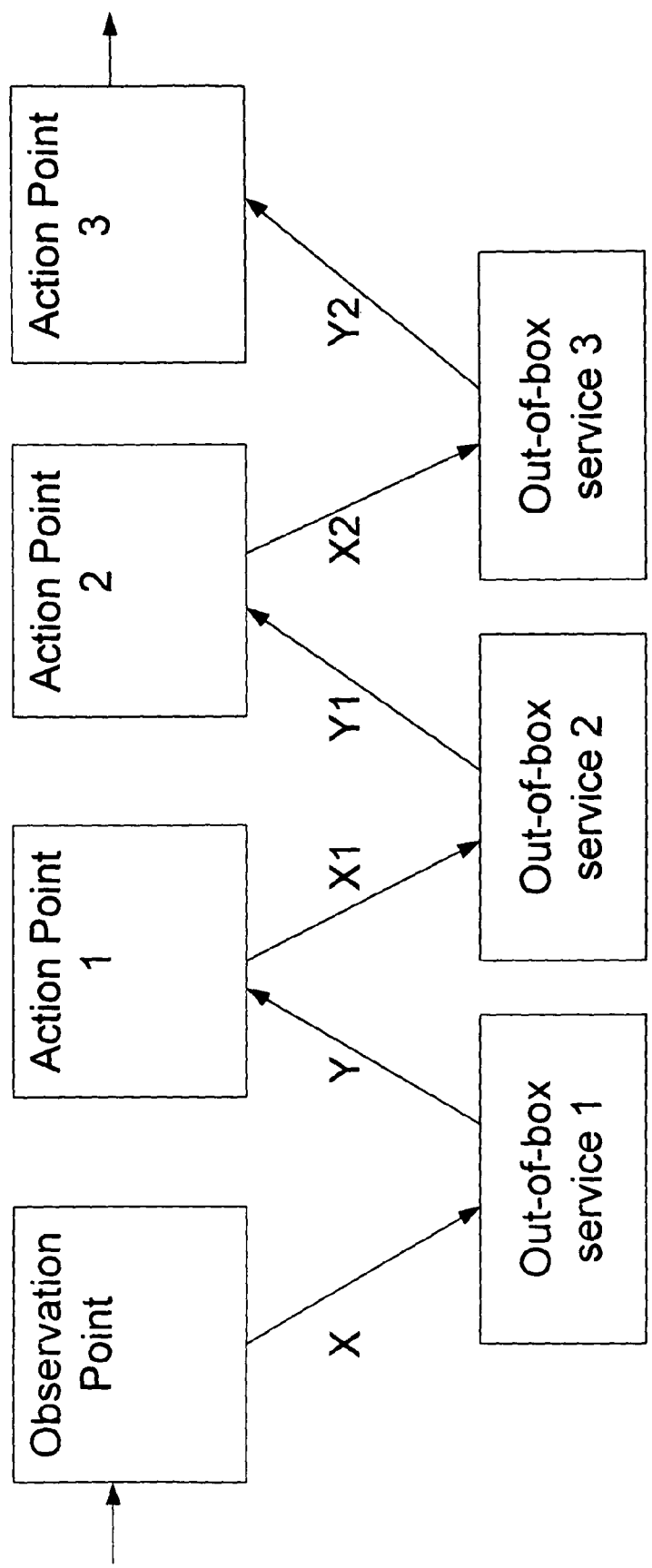
FIG. 2 shows a schematic view of a packet flow being subjected to multiple out-of-box services according to WO 2006/000629.

According to the invention, a number of VLANs with a specific VLAN ID is configured. Each VLAN comprises a number of specific out-of-box servers performing one or more specific out-of-box services on a packet flow. Each out-of-box server comprises a forwarding table which specifies to which out-of-box server or out-of-box interface the packets are to be forwarded after performing the one or more out-of-box services on the packet flow. In the exemplary embodiment shown in FIG. 3, VLAN X e.g., comprises out-of-box servers 1, 2 and 3, the out-of-box services being performed by the out-of-box servers being e.g., spam blocking, virus checking and data compression. The packets processed by out-of-box server 1 are forwarded to out-of-box server 2, as specified in the forwarding table of out-of-box server 1. The packets processed by out-of-box server 2 are forwarded to out-of-box server 3, as specified in the forwarding table of out-of-box server 2. The packets processed by out-of-box server 3 are forwarded to out-of-box interface Y, as specified in the forwarding table of out-of-box server 3. In this way a number of out-of-box services on a number of out-of-box servers can be performed in a very efficient way. In contrast to the prior art solution illustrated in FIG. 2, only one observation/action point needs to be invoked according to the present invention and in each direction (in and out of the router) only one out-of-box interface is passed.

It will be clear to a person skilled in the art that the same applies to the inverse communication path from B to A. In this case the packets are sent through out-of-box interface Y to out-of-box server 3. Out-of-box server 3 performs the inverse operation of data compression, i.e., data decompression, and sends the processed packets to out-of-box server 2, as specified in the forwarding table. Out-of-box servers 2 and out-of-box server 1 perform the inverse operations of virus checking and spam blocking respectively and send the processed packets to the destination specified in their respective forwarding tables. This results in the packets from B being sent back to the router via out-of-box interface X and from the router to A.

According to the invention, a number of VLANs can be configured, each VLAN comprising a specific number of out-of-box servers. Each out-of-box server receives packets with a specific VLAN ID, performs its one or more out-of-box services and sends the packets to the destination specified in the forwarding tables of the specific VLAN. In this way for each VLAN ID, a specific number and order of out-of-box services can be invoked by the router by addressing the appropriate VLAN with its corresponding VLAN ID. In terms of services, the invention will be most beneficial to implement different bundles of value-added services to different customer groups. A specific customer group can be recognized by the router on e.g., basic IP information, such as the 5-tuple in the IP packet header (Destination address, Source address, Protocol, Destination port, Source port). According to the invention, the router is able to send the packets of a recognized customer group to the appropriate VLAN, thereby triggering the out-of-box services matching the services defined for a specific customer group.

It will be clear to a person skilled in the art that the application of the invention is most beneficial compared to the prior art and alternative approach as disclosed in WO 2006/000629, because more than one out-of-box service can be applied to intermediately routed packets by a single re-routing action in the router and thus resource consumption with respect to out-of-box interfaces, observation points and action points is largely decreased.

Furthermore, it will be clear that routing can mean routing at layer 3, but also switching at layer 2 or 4. A packet can be a packet such as an IP packet, but also a frame such as a Frame Relay frame or a cell such as an ATM cell.

The invention claimed is:

1. A system comprising a packet router connected to a plurality of out-of-box servers, the servers being configured for performing out-of-box services, wherein:
   said out-of-box servers are configured to form a virtual local area network (VLAN) identified by one VLAN identification (ID); and
   said packet router is configured to send packets, in a single action, to said VLAN having said VLAN ID such that the packets are subjected to an ordered sequence of a specific number of the out-of-box servers which process the packets to provide the out-of-box services.

2. The system recited in claim 1 wherein each one of the out-of-box servers comprises a forwarding table specifying a next one of the out-of-box servers to which the packets are to be forwarded after a given one of the out-of-box services has been performed, by said each one server, on the packets.

3. The system recited in claim 1 wherein said out-of-box services comprise spam blocking, virus checking and data compression.

4. The system recited in claim 2 wherein said out-of-box services comprise spam blocking, virus checking and data compression.

5. The system recited in claim 1 wherein each of the out-of-box services is higher, in network hierarchy, than a layer 3 service.

6. The system recited in claim 1 wherein the packet router is further configured to recognize information of a specific customer group from said packets so as to define a recognized customer group, and to send ones of the packets and associated with the recognized customer group to a VLAN corresponding to the information of the recognized customer group.

7. The system recited in claim 2 wherein the packet router is further configured to recognize information of a specific customer group from said packets so as to define a recognized customer group, and to send ones of the packets and associated with the recognized customer group to a VLAN corresponding to the information of the recognized customer group.

8. The system recited in claim 3 wherein the packet router is further configured to recognize information of a specific customer group from said packets so as to define a recognized customer group, and to send ones of the packets and associated with the recognized customer group to a VLAN corresponding to the information of the recognized customer group.

9. The system recited in claim 4 wherein the packet router is further configured to recognize information of a specific customer group from said packets so as to define a recognized customer group, and to send ones of the packets and associated with the recognized customer group to a VLAN corresponding to the information of the recognized customer group.

10. The system recited in claim 5 wherein the packet router is further configured to recognize information of a specific customer group from said packets so as to define a recognized customer group, and to send ones of the packets and associated with the recognized customer group to a VLAN corresponding to the information of the recognized customer group.

11. A method for routing packets in a system comprising a packet router connected to a plurality of out-of-box servers, the servers being configured for performing out-of-box services, wherein the method comprises the steps of:
   configuring the out-of-box servers to form a virtual local area network (VLAN) identified by one VLAN identification (ID); and
   sending, by the router, packets, in a single action, to said VLAN having said VLAN ID such that the packets are subjected to an ordered sequence of a specific number of the out-of-box servers which process the packets to provide the out-of-box services.

12. The method recited in claim 11 wherein each one of the out-of-box servers comprises a forwarding table, and the method further comprises the step of forwarding, as specified by the routing table, the packets to a next one of the out-of-box servers after a given one of the out-of-box services has been performed by said each one server on the packets.

13. The method recited in claim 11 wherein said out-of-box services comprise spam blocking, virus checking and data compression.

14. The method recited in claim 12 wherein said out-of-box services comprise spam blocking, virus checking and data compression.

15. The method recited in claim 11 wherein each of the out-of-box services is higher, in network hierarchy, than a layer 3 service.

16. The method recited in claim 11 further comprising the steps of:
  recognizing information of a specific customer group from said packets so as to define a recognized customer group;
  and sending ones of the packets of said recognized customer group to a VLAN corresponding to the information of the customer group.

17. The method recited in claim 12 further comprising the steps of:
  recognizing information of a specific customer group from said packets so as to define a recognized customer group;
  and sending ones of the packets of said recognized customer group to a VLAN corresponding to the information of the customer group.

18. The method recited in claim 13 further comprising the steps of:
  recognizing information of a specific customer group from said packets so as to define a recognized customer group;
  and sending ones of the packets of said recognized customer group to a VLAN corresponding to the information of the customer group.

19. The method recited in claim 14 further comprising the steps of:
  recognizing information of a specific customer group from said packets so as to define a recognized customer group;
  and sending ones of the packets of said recognized customer group to a VLAN corresponding to the information of the customer group.

20. The method recited in claim 15 further comprising the steps of:
  recognizing information of a specific customer group from said packets so as to define a recognized customer group;
  and sending ones of the packets of said recognized customer group to a VLAN corresponding to the information of the customer group.

* * * * *